United States Patent
Arai et al.

(10) Patent No.: US 6,851,810 B2
(45) Date of Patent: Feb. 8, 2005

(54) REAR PROJECTOR AND PRODUCING METHOD THEREOF

(75) Inventors: Jun Arai, Matsumoto (JP); Haruyoshi Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/370,688

(22) Filed: Feb. 24, 2003

(65) Prior Publication Data

US 2003/0202162 A1 Oct. 30, 2003

(30) Foreign Application Priority Data

Mar. 13, 2002 (JP) ........................................ 2002-069340

(51) Int. Cl.⁷ ........................ G03B 31/00; G03B 31/30; G03B 21/14; G03B 21/22; G03B 21/56
(52) U.S. Cl. ............................ 353/15; 353/17; 353/18; 353/79; 353/119; 359/444; 359/460; 348/787; 348/789; 348/836
(58) Field of Search ............................... 353/15, 17–18, 353/79, 119; 359/460, 453, 444; 348/787, 789, 836

(56) References Cited

U.S. PATENT DOCUMENTS

| | | | | |
|---|---|---|---|---|
| 2,004,583 A | * | 6/1935 | Newman | 359/444 |
| 4,998,283 A | * | 3/1991 | Nishida et al. | 381/388 |
| 5,025,474 A | * | 6/1991 | Tanaka et al. | 381/333 |
| D354,486 S | * | 1/1995 | Morita et al. | D14/133 |
| 5,400,414 A | * | 3/1995 | Thiele | 381/190 |
| D368,087 S | * | 3/1996 | Gioscia | D14/128 |
| 5,781,642 A | * | 7/1998 | Tanaka et al. | 381/345 |
| 5,808,704 A | * | 9/1998 | Yoshikawa et al. | 348/748 |
| 6,533,063 B1 | * | 3/2003 | Ikeuchi et al. | 181/176 |
| 6,661,473 B1 | * | 12/2003 | Teshima et al. | 348/787 |
| D485,539 S | * | 1/2004 | Goto et al. | D14/128 |
| 2003/0189694 A1 | * | 10/2003 | Yamada et al. | 353/77 |
| 2003/0189695 A1 | * | 10/2003 | Arai et al. | 353/77 |
| 2004/0021835 A1 | * | 2/2004 | Yamada et al. | 353/74 |

FOREIGN PATENT DOCUMENTS

| | | |
|---|---|---|
| JP | A 8-304739 | 11/1996 |
| JP | 08-304739 | 11/1996 |

* cited by examiner

*Primary Examiner*—Judy Nguyen
*Assistant Examiner*—Magda Cruz
(74) *Attorney, Agent, or Firm*—Oliff & Berridge, PLC

(57) ABSTRACT

A rear projector has a lower cabinet disposing an image generator and an upper cabinet for a screen body to be mounted, two woofer boxes being mounted on the front side of the lower cabinet and high-pitched sound speaker boxes being respectively mounted on the right and left lateral sides of the upper cabinet, so that, since the woofer box is disposed in the lower cabinet, vibration is not easily transferred to a screen body on the upper cabinet and a reflection mirror inside the upper cabinet, thus avoiding flicker of the image on the screen body even when great volume of sound is outputted by the woofer box.

7 Claims, 16 Drawing Sheets

REAR PROJECTOR AND PRODUCING METHOD THEREOF

BACKGROUND OF THE INVENTION

1. Field of the Invention

The present invention relates to a rear projector having an image generator including an optical device for modulating a light beam irradiated by a light source to form an optical image in accordance with image information and a projection optical system for enlarging and projecting the optical image, a sound output for outputting sound in accordance with sound information inputted together with the image information, a box-shaped casing for disposing the image generator, and a screen exposed on one of the lateral sides of the casing onto which the optical image formed by the image generator is projected, and a producing method thereof.

2. Description of Related Art

Recently, a rear projector has come to be used in the field of home theater etc. Such rear projector has an image generator for generating a projection image, a box-shaped casing disposing the image generator and a reflection mirror for reflecting the projected image and a transmissive screen exposed on a side of the box-shaped casing.

The image generator has a light source lamp, an optical device such as a liquid crystal panel for modulating a light beam irradiated by the light source lamp in accordance with image information, and a projection optical system such as a projection lens for enlarging and projecting the generated optical image.

The optical image generated by the image generator is reflected on a mirror etc. to be projected on the transmissive screen, which is transmitted through the screen to be viewed as an image.

Such rear projector is provided with a sound output such as a speaker at a position inside the casing not to block the optical path of the light beam irradiated by a projection lens at the back of the screen.

The sound output has a low-pitched sound speaker such as a woofer and a high-pitched sound speaker such as a tweeter to output sound in accordance with the sound information inputted together with the image information, so that the audience can listen to sound while viewing the large-screen image projected on the screen with much presence.

However, when the sound output having a woofer and a tweeter is disposed inside the casing, the screen or the reflection mirror inside the casing can be vibrated by the outputted sound, thereby causing flicker on the projected image. The flicker increases when the volume of the sound outputted by the low-pitched sound speaker is magnified, so that there is certain difficulty in viewing the image.

On the other hand, in order to provide a large-screen image having much presence to the audience, it is preferable that the volume of the sound outputted by the low-pitched sound speaker is increased.

SUMMARY OF THE INVENTION

An object of the present invention is to provide a rear projector capable of displaying large-screen image with much presence without causing flicker on the image projected on a screen even when great volume of sound is outputted by a low-pitched sound speaker, and producing method thereof.

A rear projector according to an aspect of the present invention has: an image generator including an optical device that modulates a light beam irradiated by a light source to form an optical image in accordance with image information, and a projection optical system that enlarges and projects the optical image; a sound output that outputs sound in accordance with sound information inputted together with the image information; a box-shaped casing that disposes the image generator; and a screen exposed on one of the sides of the casing onto which the optical image generated by the image generator is projected, in which the casing has a lower casing that disposes the image generator and an upper casing on which the screen is provided, the sound output has a low-pitched sound speaker and a high-pitched sound speaker, and the low-pitched sound speaker is provided on the lower casing and the high-pitched sound speaker is provided on a side of the upper casing intersecting a side on which the screen is provided.

According to the above arrangement, since the low-pitched sound speaker is disposed in the rigid lower casing, the vibration caused by low-pitched frequency is not easily transferred to the screen provided on the upper casing and the reflection mirror provided in the upper casing as required, the image projected on the screen is not flickered even when large volume of sound is outputted by the low-pitched sound speaker.

Further, since the high-pitched sound speaker is provided on a side intersecting the side of the upper casing provided with the screen, the sound outputted by the high-pitched sound speaker is directly heard by an audience without being blocked by the screen, so that the screen is not deformed in out-plane direction by the sound pressure of the high-pitched sound speaker, thereby providing high-quality large-screen image to the audience.

In the above arrangement, the upper casing may preferably have a front section having an opening for the screen to be attached and a body section in which an optical path of the light beam irradiated by the projection optical system is set, the high-pitched sound speaker may preferably be disposed in a casing component independent of the upper casing, and the casing component may preferably be attached to the front section.

Since the high-pitched sound speaker is disposed in a casing component independent of the upper casing, the size of the component of the upper casing such as the front section for the large screen to be attached and the body section corresponding to the front section is not too much enlarged. Accordingly, when the front section and the body section are produced by, for instance, injection molding, the size of the die is not increased, thus reducing the cost for the die.

In the above, a frame surrounding the opening along the periphery thereof and receiving the screen with a gap retained there between on the front section may preferably be formed, where the front section may preferably have a plurality of connectors formed at a position corresponding to the gap between the frame and the screen to be connected with the body section.

When the front section is produced by injection molding, the connector may be a part of the frame bulging toward the periphery of the opening and having a hole for guiding a screw to be connected with the body section.

By forming a gap between the frame and the screen, the bent of the screen in attaching the screen caused by dimension error of the screen and the front section can be avoided. Since the connector is formed on the gap, there is no need for forming a separate connecting means with the body section on the front section. Further, when the front section is produced by injection molding, the connector can be formed only by bulging a part of the frame, so that the frame and the connector can be integrally formed, thus preventing the structure of the die for forming the front section from being complicated.

The low-pitched sound speaker may preferably be disposed in a casing component independent of the lower casing and may preferably be attachable to/detachable from the lower casing together with the casing component.

Since the low-pitched sound speaker is disposed in a dedicated casing component, directivity can be given to the sound outputted by the speaker, thus obtaining excellent acoustic effect. Further, since the speaker is attachable to/detachable from the lower casing, the image generator can be adjusted by detaching the speaker, thus facilitating the adjustment of the rear projector.

A producing method according to another aspect of the present invention is for producing a rear projector, including: an image generator including an optical device that modulates a light bean irradiated by a light source to form an optical image in accordance with image information, and a projection optical system that enlarges and projects the optical image; a box-shaped casing that disposes the image generator; a screen exposed on one of the sides of the casing onto which the optical image generated by the image generator is projected; and a sound output provided on a side of the casing intersecting the side provided with the screen and disposed in a casing component independent of the casing, the sound output outputting sound in accordance with sound information inputted together with the image information, the casing comprising a front section having an opening for the screen to be attached and a body section in which an optical path of the light beam irradiated by the projection optical system is set, the method comprising the steps of: attaching the screen on the front section; attaching the front section attached with the screen to the body section; and after attaching the front section, fixing the casing component disposing the sound output to the front section to be attached to a lateral side of the body section.

According to the above aspect of the present invention, since the sound output is attached after attaching the front section attached with the screen to the body section, the sound output can be attached while protecting the light-incident surface of the screen with the front section and the body section, so that adhesion of dust on the light-incident surface of the screen can be prevented in attaching the sound output.

BRIEF DESCRIPTION OF THE DRAWINGS

FIG. 15 is an illustration seen from rear side showing the screen cover with the screen body being attached; and.

DETAILED DESCRIPTION OF PREFERRED EMBODIMENT(S)

An embodiment of the present invention will be described below with reference to attached drawings.

1. Primary Arrangement of Rear Projector

Figure 1:
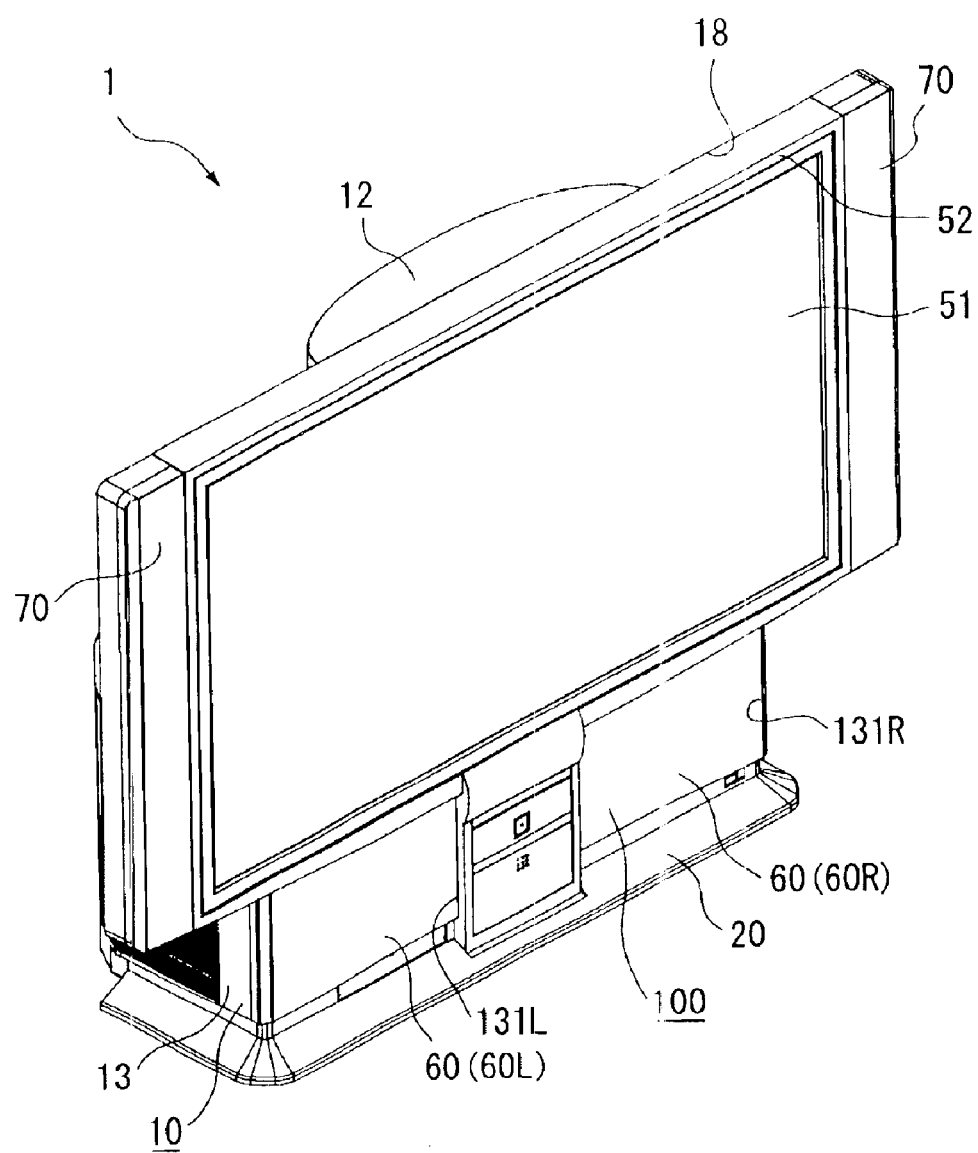
FIG. 1 is a perspective view of a rear projector seen from front side according to the present invention.
Figure 2:
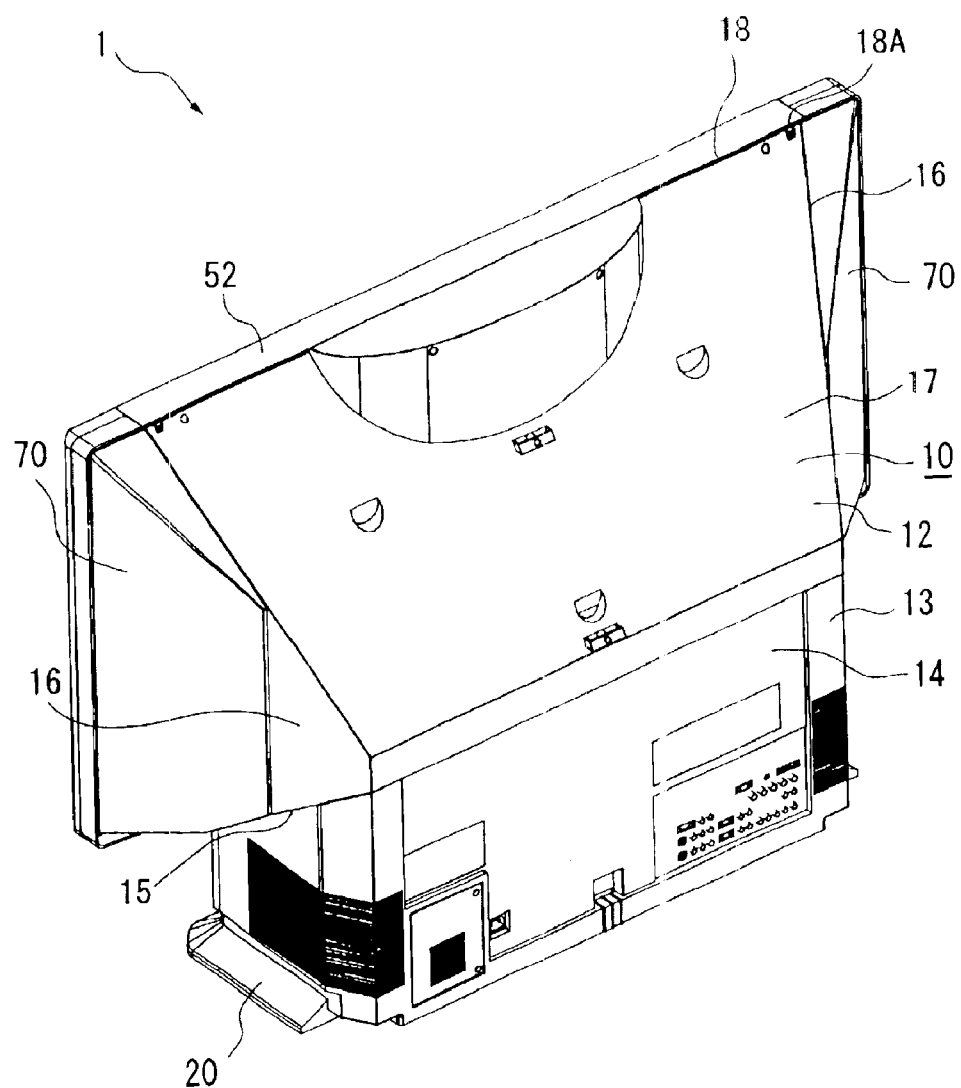
FIG. 2 is a perspective view of the rear projector seen from rear side.
Figure 3:
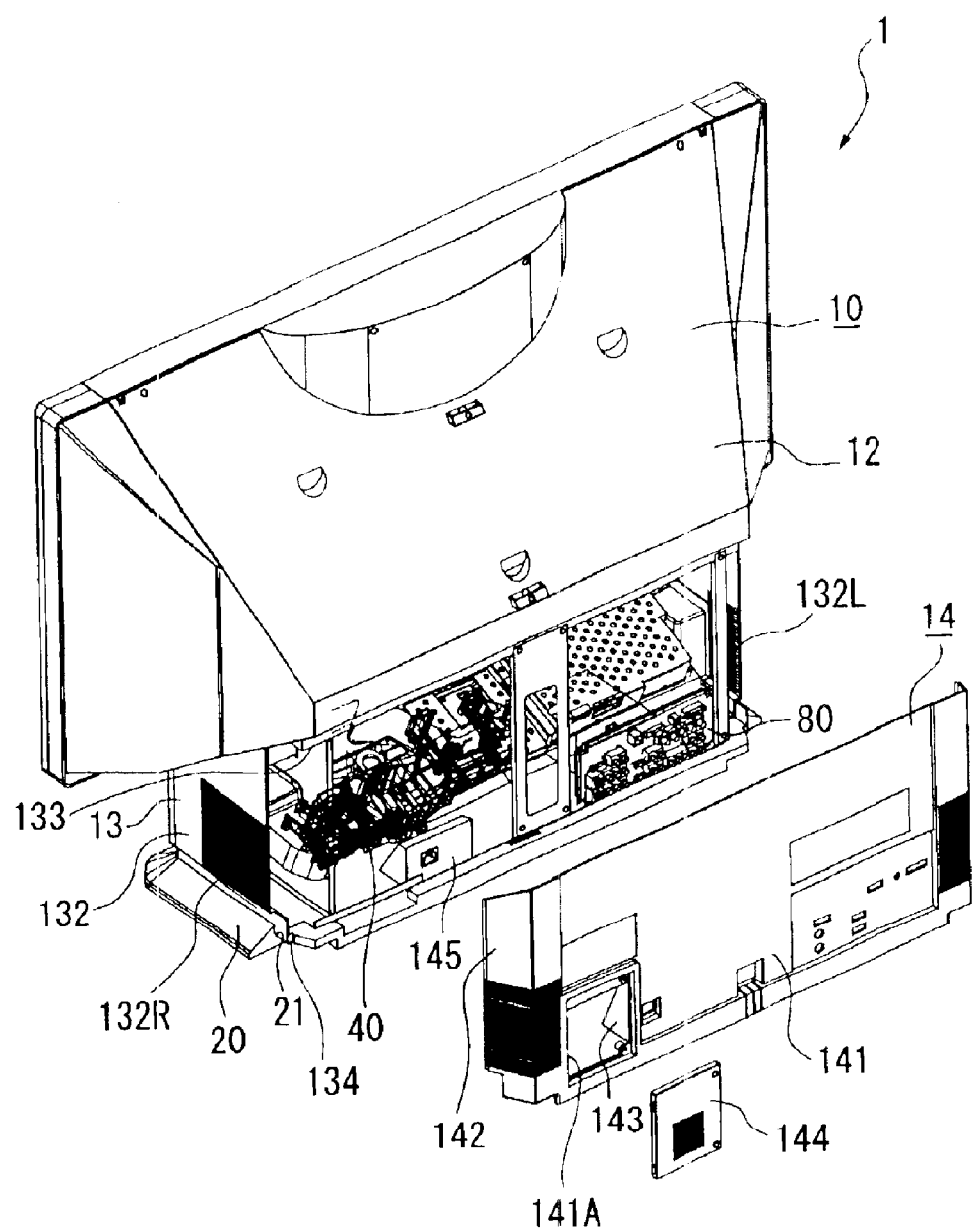
FIG. 3 is an exploded perspective view of the rear projector seen from rear side, which specifically shows that a back cover is removed from FIG. 2.
Figure 4:
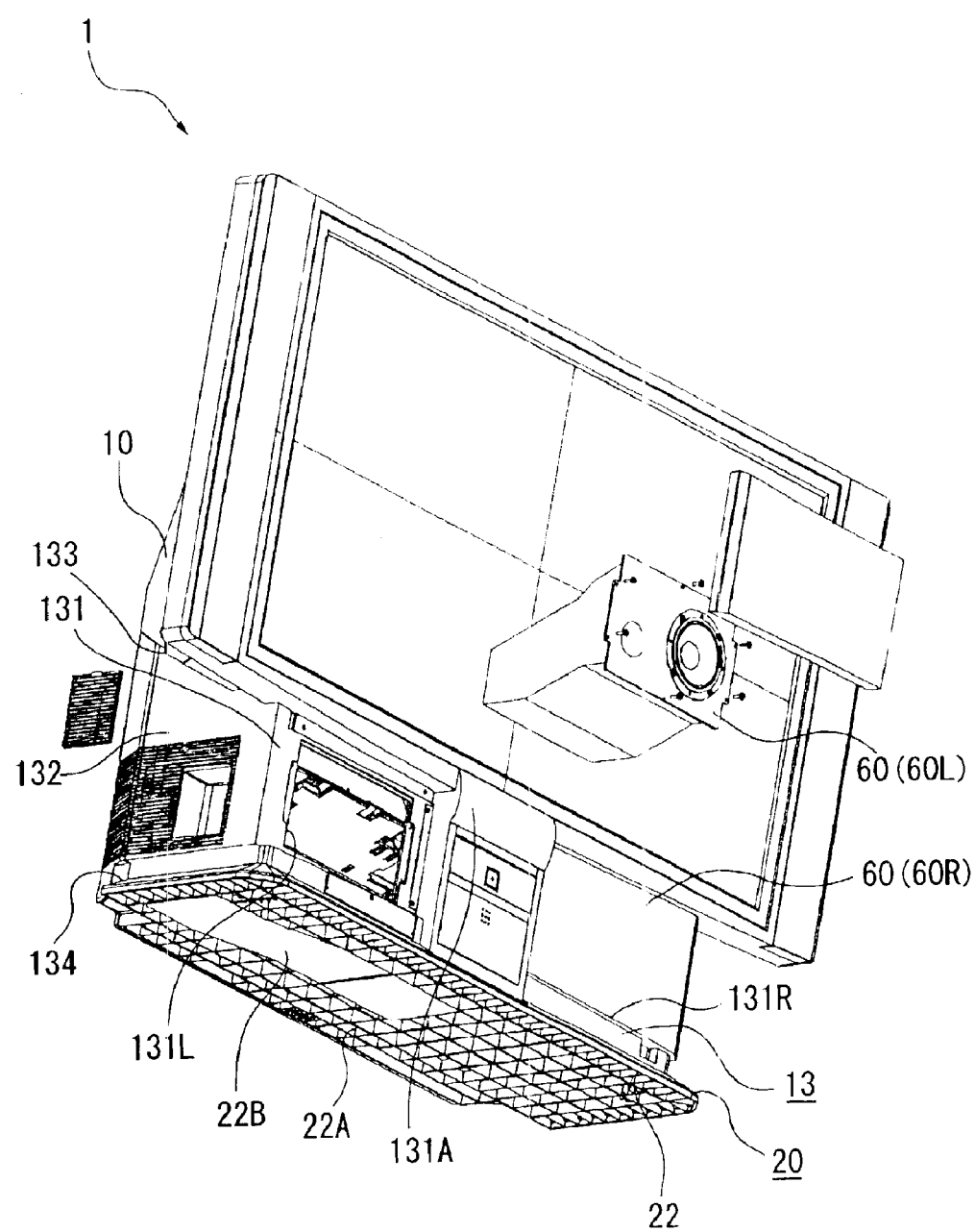
FIG. 4 is an exploded perspective view of the rear projector seen from bottom side.
Figure 5:
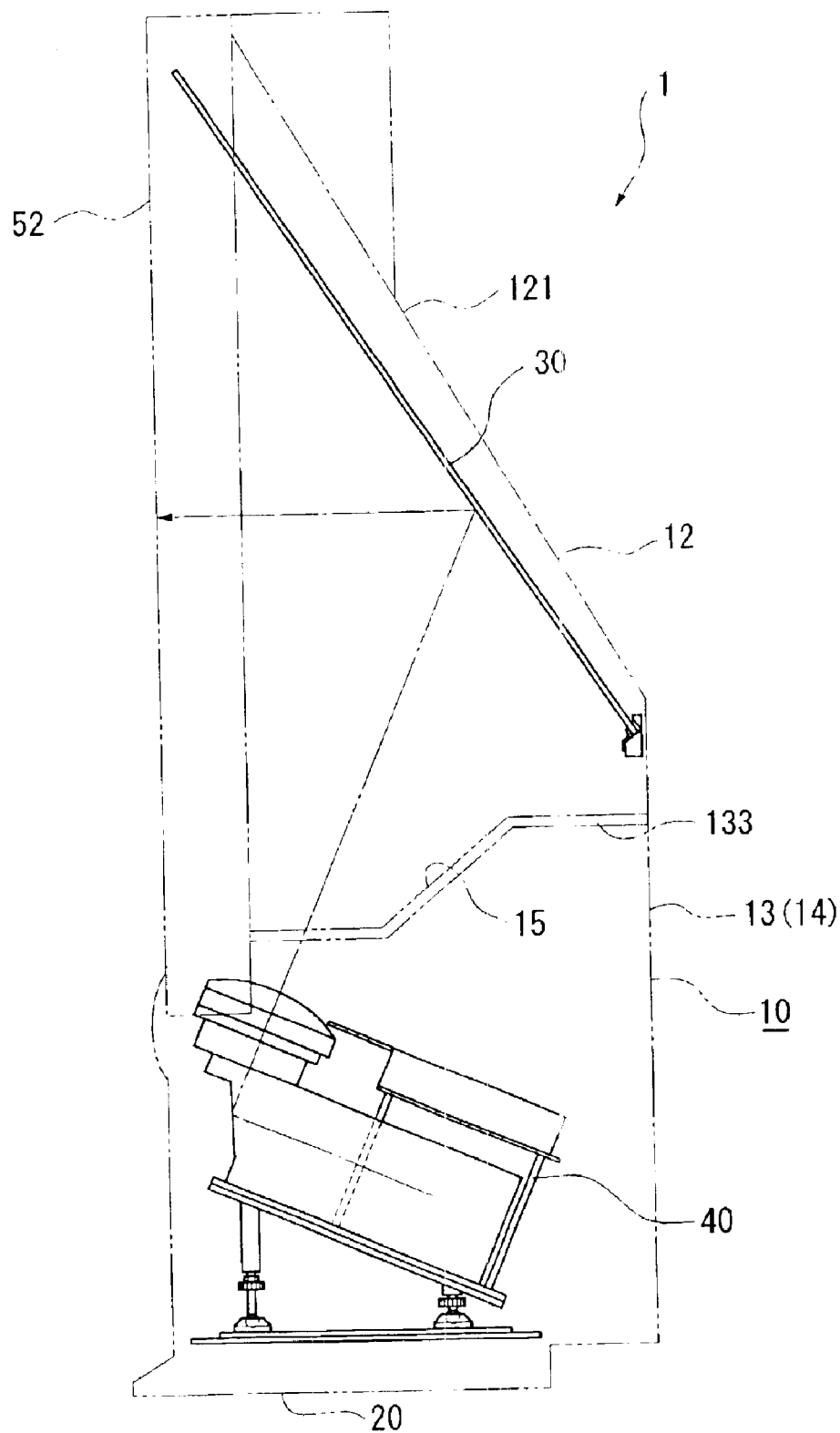
FIG. 5 is a vertical cross section of the rear projector.

FIG. 1 is a perspective view seen from front side of a rear projector 1 according to an aspect of the present invention. FIG. 2 is a perspective view of the rear projector 1 seen from rear side thereof. FIG. 3 is an exploded perspective view of the rear projector 1 seen from rear side, which specifically shows the rear projector 1 with a back cover 14 being removed from FIG. 2. FIG. 4 is an exploded perspective view of the rear projector 1 seen from lower side. FIG. 5 is a vertical cross section showing the rear projector 1.

A primary arrangement of the rear projector 1 will be described below with reference to FIGS. 1 to 5.

As shown in FIGS. 1 to 5, the rear projector 1 modulates a light beam irradiated by a light source in accordance with image information to form an optical image, and enlarges and projects the optical image on a screen, while outputting sound.

The rear projector 1 includes a cabinet 10 constituting a casing, a leg 20 provided on the lower side of the cabinet 10, an interior unit 40 as an image generator located inside the cabinet 10, a reflection mirror 30 also located inside the cabinet 10, a screen 51 as a screen exposed on a front side of the cabinet 10, and a sound output 100.

The cabinet 10, the interior unit 40, the reflection mirror 30 and the screen 51 constitute a projector body.

Incidentally, for the convenience of explanation, left side seen from front side is referred to as left and right side seen from front side is referred to as right in the present embodiment.

The cabinet 10 is a casing of synthetic resin for disposing the interior unit 40 and the reflection mirror 30. As shown in FIG. 3, the cabinet 10 accommodates the interior unit 40 and has a lower cabinet 13 of C-shaped vertical cross section as a lower casing covering approximately entire front, upper and lower sides and right and left sides, a back cover 14 covering the rear side and a part of the right and left sides, and an upper cabinet 12 of triangle vertical cross section as an upper casing disposed on the upper side of the lower cabinet 13.

The dimension of the lower cabinet 13 in right and left direction along the surface of the screen 51 is smaller than the dimension of the upper cabinet 12 in right and left direction along the surface of the screen 51.

The back cover 14 is detachably attached to the lower cabinet 13.

As shown in FIG. 4, the lower cabinet 13 includes a front side 131, right and left lateral sides 132, an upper side 133 and a lower side 134.

A central portion 131A bulging toward front side in accordance with projection of a projection lens constituting the interior unit 40 is provided approximately at the center of the front side 131. Rectangular openings 131R and 131L of approximately the same dimension are formed on both sides of the central portion 131A.

Woofer boxes 60 (60R and 60L) as speakers constituting the sound output 100 for reproducing low-pitched sound are respectively attached to the openings 131R and 131L.

Incidentally, though not clearly shown in the illustration, various device-connecting terminals such as connector for connecting a computer, a video input terminal and audio-connection terminal are provided on the lower side of the left opening 131L.

Further, as shown in FIG. 3, slit-shaped openings are formed on the right and left lateral sides 132 of the lower cabinet 13. The left opening is an intake opening 132L for introducing a cooling air into the interior of the projector and the right opening is an exhaust opening 132R for discharging the air having introduced and cooled the interior.

The upper side 133 opposes to a lower side of the upper cabinet 12 (described below). The lower side 134 abuts to the receiver surface of the leg 20 (described below).

As shown in FIG. 3, the back cover 14 includes a rear side 141 and right and left lateral sides 142.

A second intake opening 141A for introducing cooling air is formed on the right side (left side seen from rear side) of the rear side 141 of the back cover 14. An air filter 143 is attached to the second intake opening 141A. A cover 144 for shutting the second intake opening 141A provided with the air filter 143 is detachably attached to the opening 141A. An opening for inlet connector 145 is provided on the left side (right side seen from rear side) of the second intake opening 141A of the rear side 141.

Various device connection terminals such as connector for connecting a computer, a video input terminal and audio-connection terminal are provided on the left side (right side seen from rear side) of the rear side 141 and an interface board 80 is provided on the inner surface of the rear side 141.

As shown in FIGS. 2 and 5, the upper cabinet 12 is a casing of triangle vertical cross section for disposing the reflection mirror 30 and holding the screen 51 in an exposed manner, which includes a screen cover 52 as a front section at the front side thereof. The details of the screen 51 will be described below.

Figure 6:
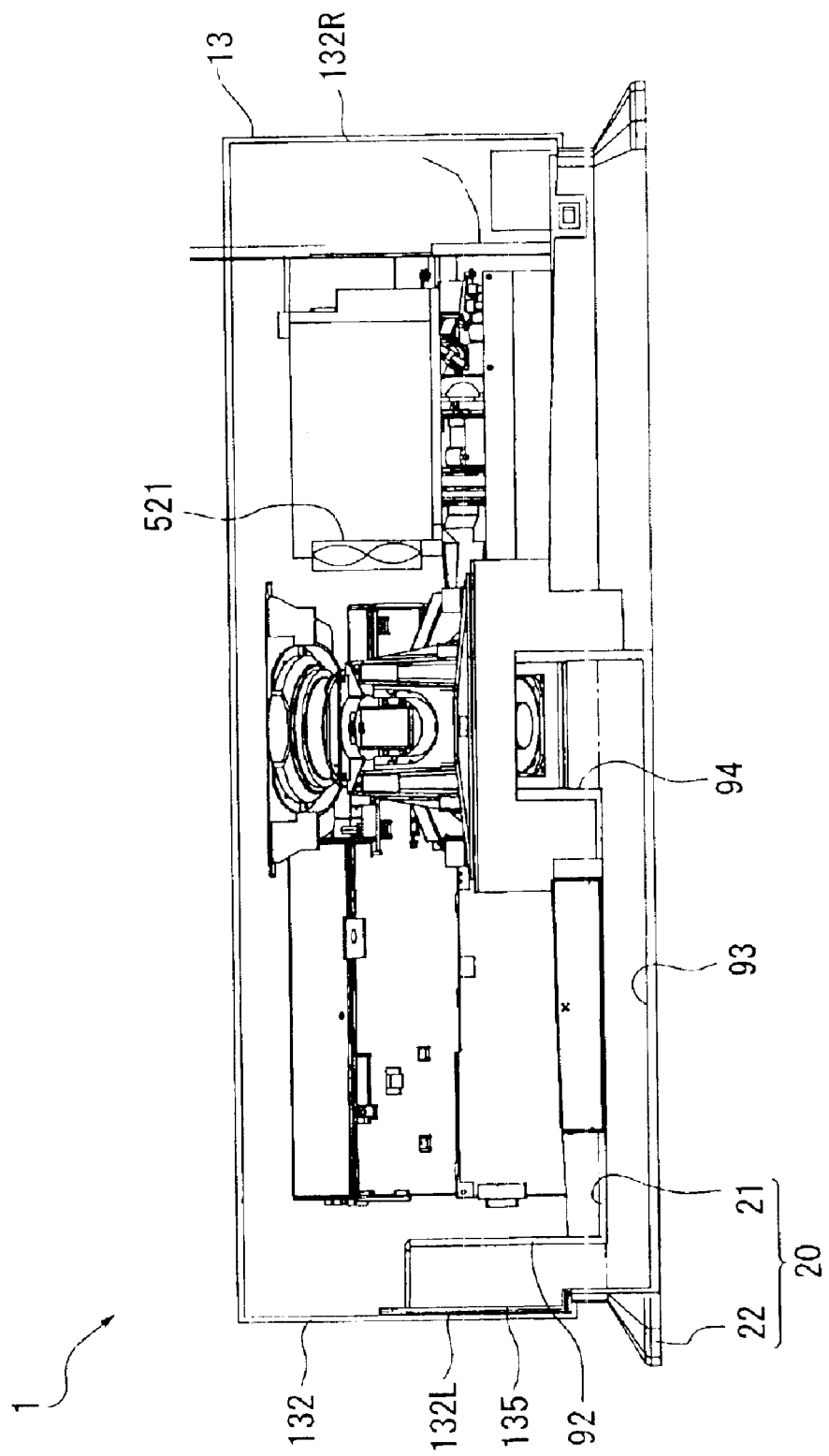
FIG. 6 is a vertical cross section of the rear projector seen from front side.

FIG. 6 is a vertical cross section of the lower cabinet 13 and the leg 20 of the rear projector 1 seen from front side.

As shown in FIGS. 3, 4 and 6, the leg 20 is a synthetic resin member supporting the projector body and covering a part of the front side 131 of the lower cabinet 13, which includes a receiver surface 21 to be abutted to the entire lower side 134 of the lower cabinet 13, and a rib-shaped support 22 surrounding the back side of the receiver surface 21 and having a predetermined height dimension.

A concave groove dented by a dimension corresponding to the height of the support 22 is formed on the receiver surface 21, the groove extending from the left side to the center of the central area in front and back direction.

As shown in FIG. 4, the backside of the support 22 abuts to a surface of floor etc. when the rear projector 1 is installed on a floor surface or upper surface of desk. A reinforcing rib 22A of matrix-shape having a predetermined height is formed on the inner circumference of the support 22. The reinforcing rib 22A enhances the rigidity of the leg 20 and prevents position shift from the floor surface etc.

A planar portion 22B having no reinforcing rib 22A is provided on a part of the inner area of the support 22, the planar portion 22B extending from the left to the center of central area in front and back direction on the backside of the support 22. The planar portion 22B is the lower side of the concave groove formed on the receiver surface 21.

As shown in FIG. 6, when the projector body is mounted on the receiver surface 21 having the concave groove, a third duct 93 extending from the left lateral side 132 of the lower cabinet 13 to the central portion in right and left direction is formed. However, the lower side of the projector body does not abut to both peripheral ends of the third duct 93 so that the peripheral end around the left lateral side 132 and the peripheral end at the approximate center are left open.

An end of a second duct 92 is connected to the opening adjacent to the left lateral side 132. The other end of the second duct 92 is connected to the intake opening 132L formed on the left lateral side 132 through an air filter 135.

An end of fourth duct 94 is connected to an opening on the central peripheral end at the central portion. The other end of the fourth duct 94 is disposed on the lower side of an optical device constituting the projector body through an elastic member such as a sponge.

Figure 7:
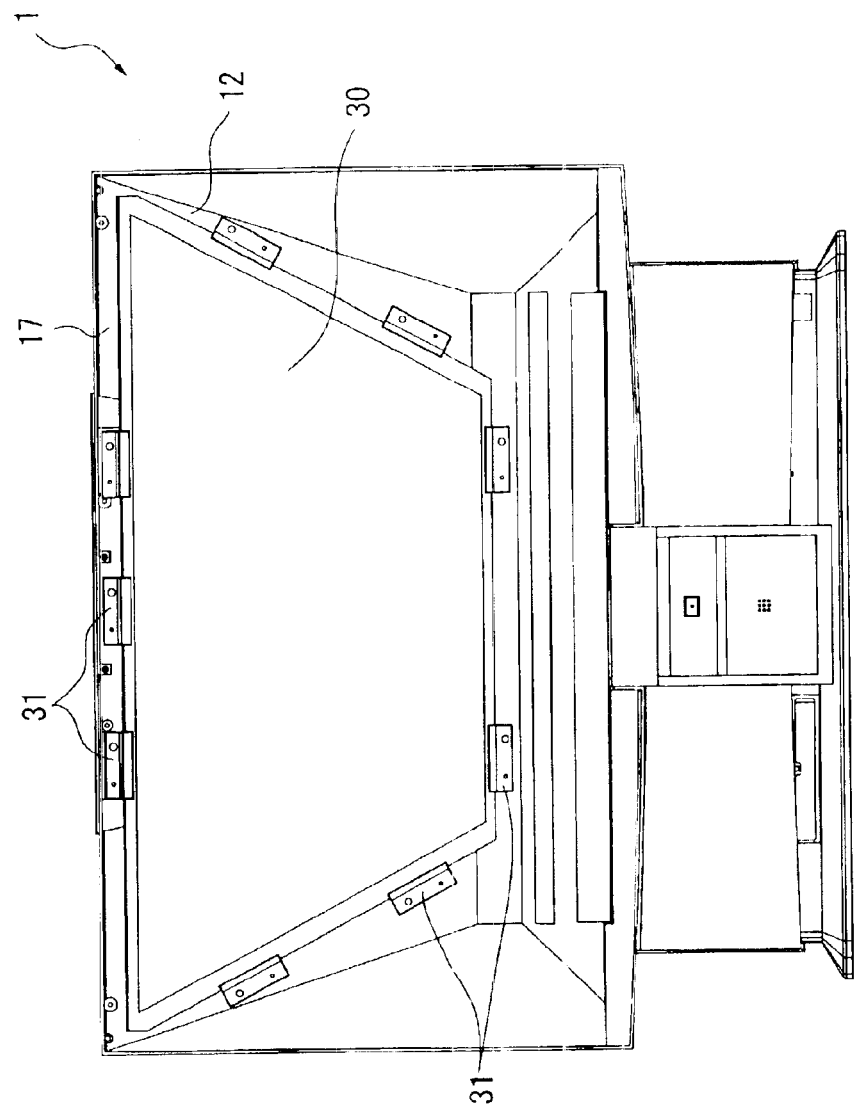
FIG. 7 is a front elevational view of the rear projector with a screen cover including a screen body being removed.

FIG. 7 is a front elevational view with the screen cover 52 including the screen 51 being removed from the upper cabinet 12 as a component of the rear projector 1.

The reflection mirror 30 is an ordinary reflection mirror of approximate trapezoidal shape, which is attached to the inner rear side of the upper cabinet 12 so that the long side of the trapezoid comes to the upper side. A mirror holder 31 for holding the reflection mirror 30 at a predetermined position is formed on an inner side of the inner rear side of the upper cabinet 12. The mirror holder 31 holds the long side, short side and oblique sides of the reflection mirror 30 so that there is no distortion on the reflection mirror 30.

2. Structure of Interior Unit

Figure 8:
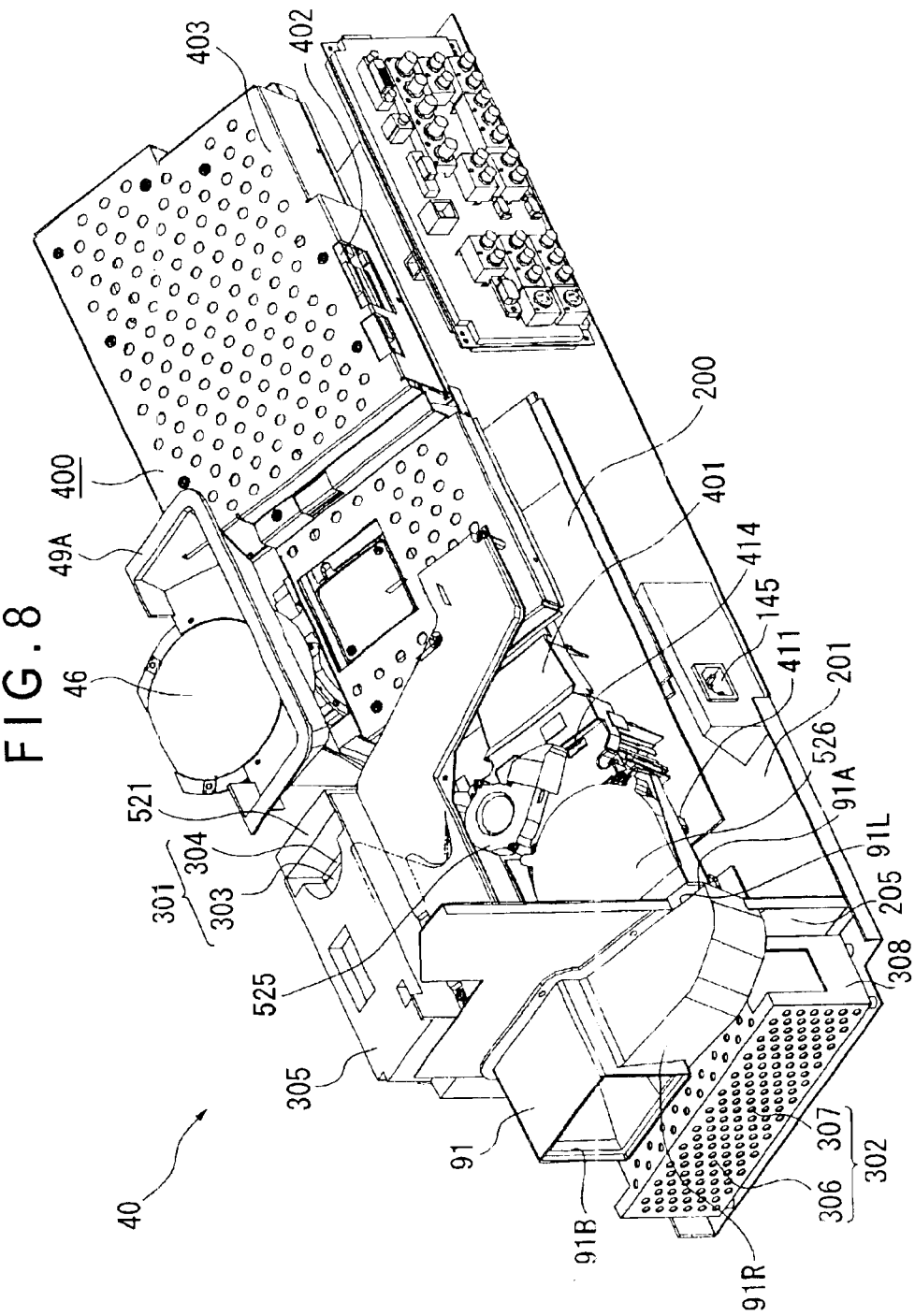
FIG. 8 is a perspective view of an interior unit constituting the rear projector seen from rear side.

FIG. 8 is a perspective view of the interior unit seen from rear side.

The interior unit 40 is a device for forming a predetermined optical image in accordance with inputted image information and outputting sound and image by amplifying the sound signal added to the image information. The interior unit 40 has an interior unit body 400, a support member 200 made of metal such as aluminum for supporting the interior unit body 400 at a predetermined attitude, a first power source 301, and a second power source 302.

Figure 9:
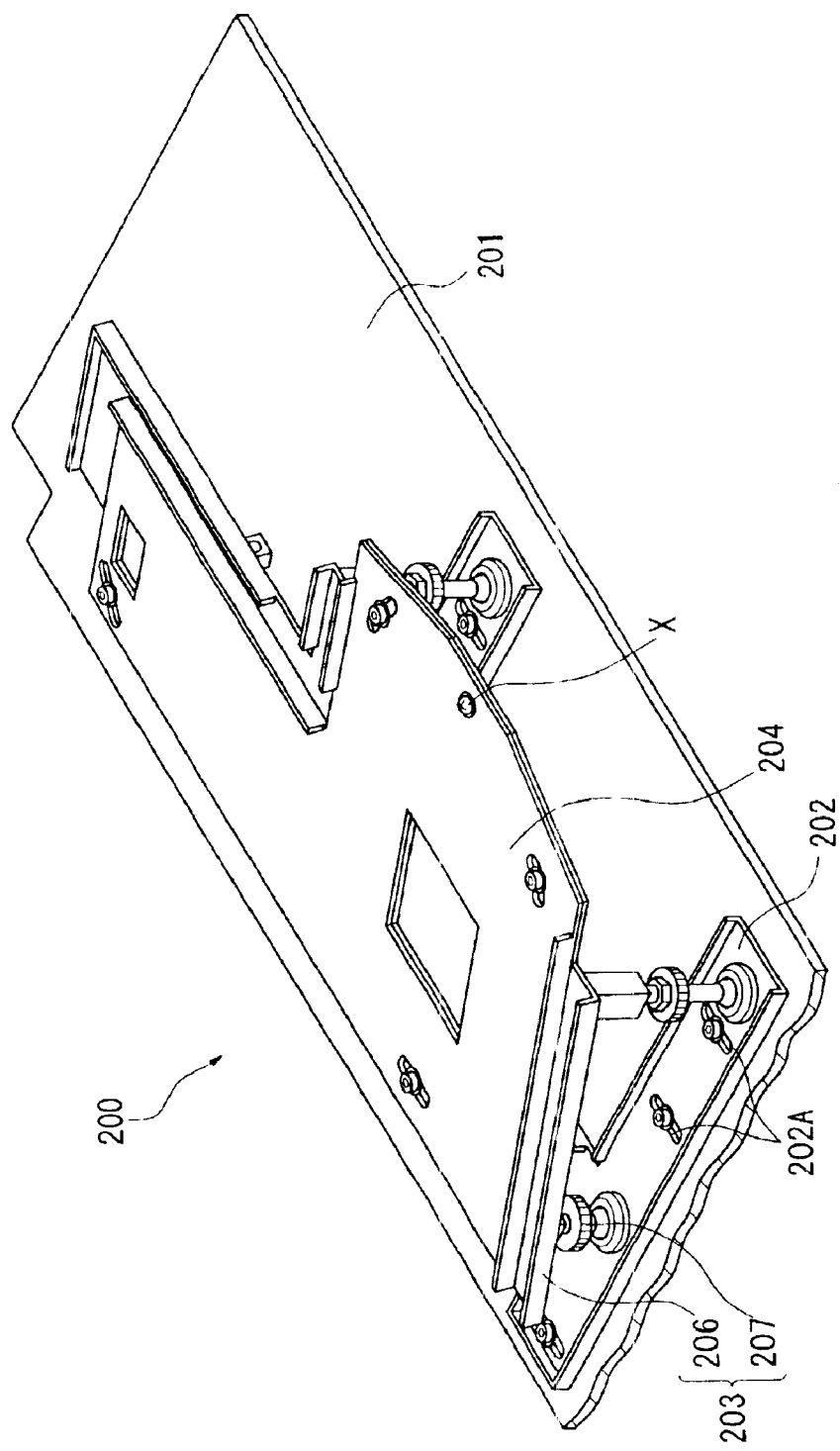
FIG. 9 is a perspective view of a support constituting the interior unit seen from front side.

FIG. 9 is a perspective view showing the support member constituting the interior unit seen from front side.

As shown in FIG. 9, the support member 200 has a flat plate base member 201 placed opposite to the lower cabinet 13 (FIG. 3) of the lower cabinet 13, a plate-shaped lateral position adjuster 202 attached to the upper side of the base member 201, an inclination position adjuster 203 fixed to the upper side of the lateral position adjuster 202 and inclined downward toward rear side, and a rotary position adjuster 204 opposing the upper side of the inclination adjuster 203.

The base member 201 is a plate member constituting the lower side of the interior unit 40, which is advanceable in front and back direction relative to the lower side 134 of the lower cabinet 13. The advancement and retraction of the base member 201 enables to take out the interior unit body 400 from the lower cabinet 13 in drawer-like slidable manner toward the rear side.

As shown in FIG. 8, a partition 205 that extends vertically to divide the inside of the lower cabinet 13 into two spaces of right and left is formed on the right side (left side seen from rear side) of the base member 201.

Back to FIG. 9, the lateral position adjuster 202 has a plurality of track 202A elongated in right and left direction. The lateral position adjuster 202 is capable of adjusting the position thereof in right and left direction relative to the base member 201 by the track 202A. Incidentally, the lateral position adjuster 202 is screwed and fixed to the base member 201 by inserting a screw to the track 202A after the position thereof in right and left direction is adjusted.

The inclination adjuster 203 has a plate-shaped inclination adjuster body 206 and legs 207 downwardly projecting respectively from the four corners of the inclination adjuster body 206.

The legs 207 are capable of vertical advancement and retraction. The distal ends of the respective legs 207 opposite to the inclination adjuster body 206 are attached to the lateral position adjuster 202. The attitude of the inclination adjuster body 206 can be adjusted relative to the lateral position adjuster 202 by vertically advancing and retracting the four legs 207.

The rotary position adjuster 204 is rotatable in in-plane direction along the upper side of the inclination adjuster body 206 by forcing a position thereof remote from the illumination optical axis position X of a projection lens 46 approximately as a rotation center in front and back direction. The interior unit body 400 is attached to the upper side of the rotary position adjuster 204 (FIG. 8).

As described above, the attitude of the interior unit body 400 including right and left direction, inclination direction (upward shift direction) and in-plane rotation direction relative to the upper side of the base member 201 can be adjusted by the lateral position adjuster 202, the inclination adjuster 203 and the rotary position adjuster 204.

As shown in FIG. 8, the interior unit body 400 includes an approximately L-shaped optical unit 401 having a light source 411 located on the right side (left side seen from rear side) and extending from the light source 411 toward left side and further front side, and a control board 402 covering a part of the right side of the optical unit 401 and extending from the center to the left side (right side seen from rear side).

The control board 402 is a board having a controller including CPU etc., which controls the drive of the optical device constituting the optical unit 401 in accordance with the inputted image information. The surroundings of the control board 402 are covered with a metal shield 403. The shield 403 covering the control board 402 is attached to the rotary position adjuster 204 spanning over the optical unit 401 through a column-shaped member. The details of the optical unit 401 will be described below.

The first power source 301 is provided on the front side of the light source 411 and on the left side of the partition 205, which includes a first power source block 303 and a lamp driving circuit (ballast) 304 adjacent to the first power source block 303.

The first power source block 303 supplies electric power fed from the outside to the lamp driving circuit 304, the control board 402 etc. through a not-illustrated power cable connected to the inlet connector 145.

The lamp driving circuit 304 supplies electric power fed from the first power source block 303 to the light source lamp constituting the optical unit 401, which is electrically coupled with the light source lamp. The lamp driving circuit 304 is, for instance, wired to a non-illustrated board.

The first power source 301 is covered with a metal shield 305 with right and left sides being opened. The shield 305 prevents leakage of electromagnetic noise. An axial-flow fan 521 for the power source is attached to a center opening of the first power source 301, which blows cooling air in a direction for the first power source 301 to be extended, i.e. from the central portion to the right side. The shield 305 works as a duct for guiding the cooling air.

The second power source 302 is provided in a space on the right side of the partition 205, which has a second power source block 306 and a sound signal amplifier 307 for amplifying the inputted sound signal, which is covered with metal shield 308.

The second power source block 306 supplies electric power fed from the outside to the sound signal amplifier 307 through a non-illustrated power cable connected to the inlet connector 145.

The sound signal amplifier 307 is driven by the electric power supplied by the second power source block 307 to amplify the inputted sound signal, which is electrically coupled with the below-described speaker box and the woofer box (not illustrated in FIG. 8). The sound signal amplifier 307 is, for instance, wired to a non-illustrated board.

3. Structure of Optical unit

Figure 10:
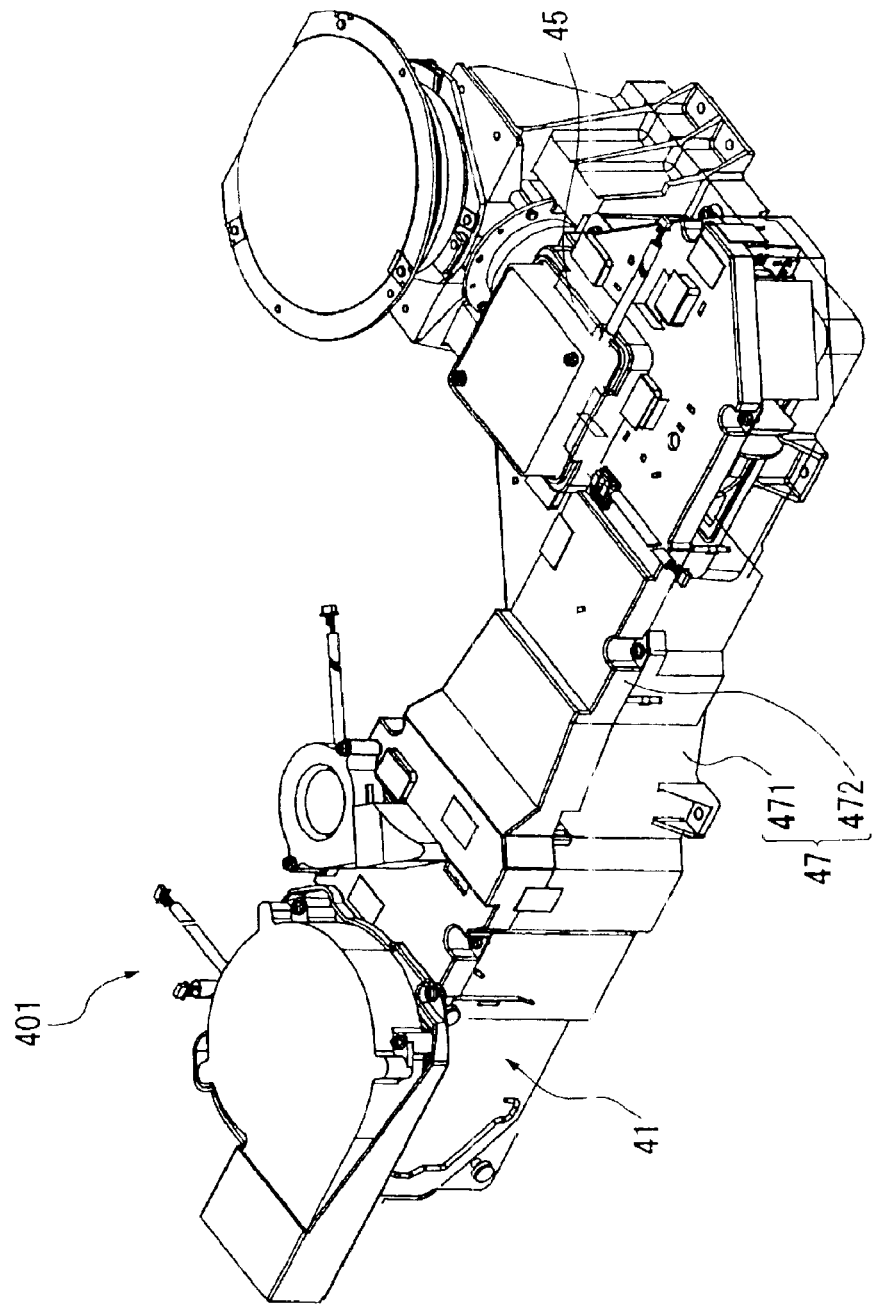
FIG. 10 is a perspective view showing an optical unit constituting the interior unit.
Figure 11:
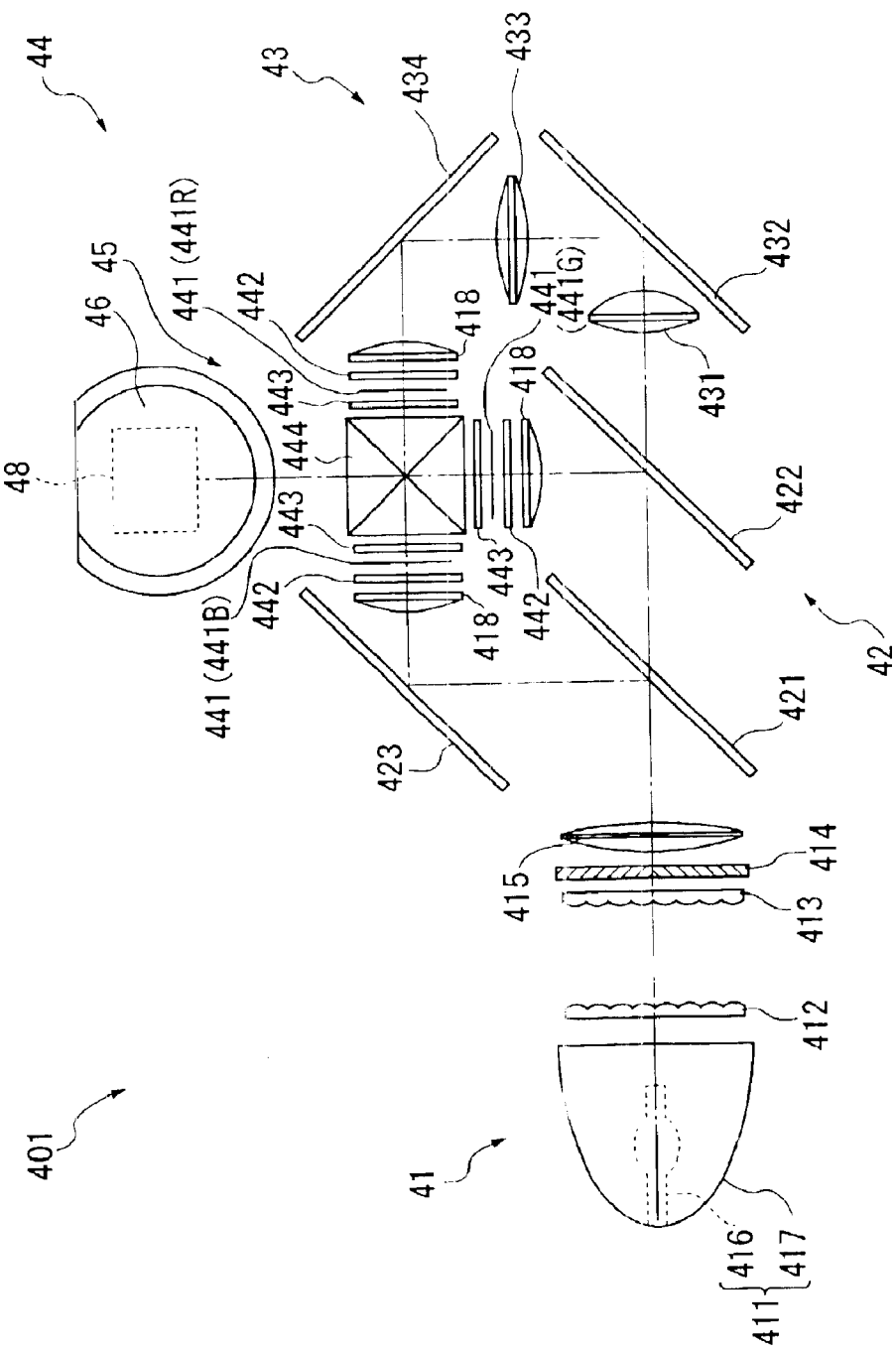
FIG. 11 is a plan view schematically showing the optical unit.

FIG. 10 is a perspective view showing the optical unit 401. FIG. 11 is a plan view schematically showing the optical unit 401.

As shown in FIG. 11, the optical unit 401 is a unit for optically processing the light beam irradiated by a light source lamp as a component of the light source to form an optical image in accordance with image information, which includes an integrator illuminating optical system 41, a color separating optical system 42, a relay optical system 43, an optical device 44, a right-angle prism 48 and the projection lens 46 as a projection optical system.

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes a light source 411, a first lens array 412, a second lens array 413, a polarization converter 414 and a superposing lens 415.

The light source 411 has a light source lamp 416 as a radiation light source and a reflector 417, which changes the radial light beam irradiated by the light source lamp 416 into a parallel light beam by the reflector 417 to emit the parallel light beam toward the outside.

A halogen lamp is used as the light source lamp 416. Incidentally, metal halide lamp and a high-pressure mercury lamp etc. may be used instead of the halogen lamp.

A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415 and is integrated with the second lens array 413 as a unit. The polarization converter 414 converts the light from the second lens array 413 to a single polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the rear projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44.

Incidentally, such polarization converter 414 is disclosed in, for instance, Japanese Patent Laid-Open publication No. Hei 8-304739.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective light beam emitted from the second lens array 413 into a light beam parallel to central axis (main beam) thereof. The field lenses 418 provided in front of the other liquid crystal panels 441G and 441B function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418. Though the red color light of the three color lights are transmitted to the relay optical system 43, other arrangement where, for instance, blue color light is transmitted thereto is possible.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam.

The polarization axes of the incident-side polarization plate 442 and the irradiation-side polarization plate 443 are set orthogonal with each other.

The cross-dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

The above-described liquid crystal panels 441, the irradiation-side polarization plate 443 and the cross dichroic prism 444 are constructed as an integrated unit of optical device body 45. Incidentally, the incident-side polarization plate 442 is slidably fitted and attached to a groove (not shown) formed on the light guide 47.

Though not specifically shown, the optical device body 45 has the cross dichroic prism 444, a metal base for supporting the cross dichroic prism 444 from the lower side, a metal holding plate for holding the incident-side polarization plate 443 attached to the light-beam incident end of the cross dichroic prism 444, and liquid crystal panels 441 (441R, 441G and 441B) held by four pins attached to the light-beam-incident side of the holding plate. A predetermined gap is secured between the holding plate and the liquid crystal panel 441, so that the cooling air is flowed through the gap.

The right-angle prism 48 is located on light-irradiation side of the cross dichroic prism 444 of the optical device 44, which bends and reflects the color image combined by the cross dichroic prism 444 in a direction of the projection lens 46, i.e. bends and reflects the forwardly-irradiated color image in upward direction.

The projection lens 46 enlarges the color image reflected by the right-angle prism 48 to project on the reflection mirror 30. The projection lens 46 is supported by a support member screwed to the rotary position adjuster 204.

As described above, the color image projected by the projection lens 46 is reflected by the reflection mirror 30 to be projected on the backside of the screen 51.

As shown in FIG. 8, a box-shaped cover 49A having open upper side is provided around the projection side of the projection lens 46. An opening for securing optical path of the projected optical image is formed around the lower side of the upper cabinet 12. The cover 49A abuts to the surrounding of the opening through an elastic member to enclose the opening.

The above-described optical systems 41 to 44 and 48 are disposed in a light guide 47 made of synthetic resin as an optical component casing shown in FIG. 10.

Though specific illustration of the inside of the light guide 47 is omitted, as shown in FIG. 10, the light guide 47 has a lower light guide 471 having the groove for the respective optical components 412 to 415, 418, 421 to 423, 431 to 434 and 442 (FIG. 11) to be slidably fitted from the above, and a lid-shaped lower light guide 472 for closing the upper opening side of the lower light guide 471.

The screen 51 is of four-layer construction of diffusion plate, Fresnel sheet, lenticule sheet and protection plate in an order from the side near the incident light, i.e. backside. The light beam irradiated by the projection lens and reflected by the reflection mirror is diffused by the diffusion plate and parallelized by the Fresnel sheet, which is diffused by optical beads constituting the lenticule sheet to obtain a display image. The details of the screen cover 52 will be described below.

4. Structure of Inner Cooling Section (Cooling Structure)

Figure 12:
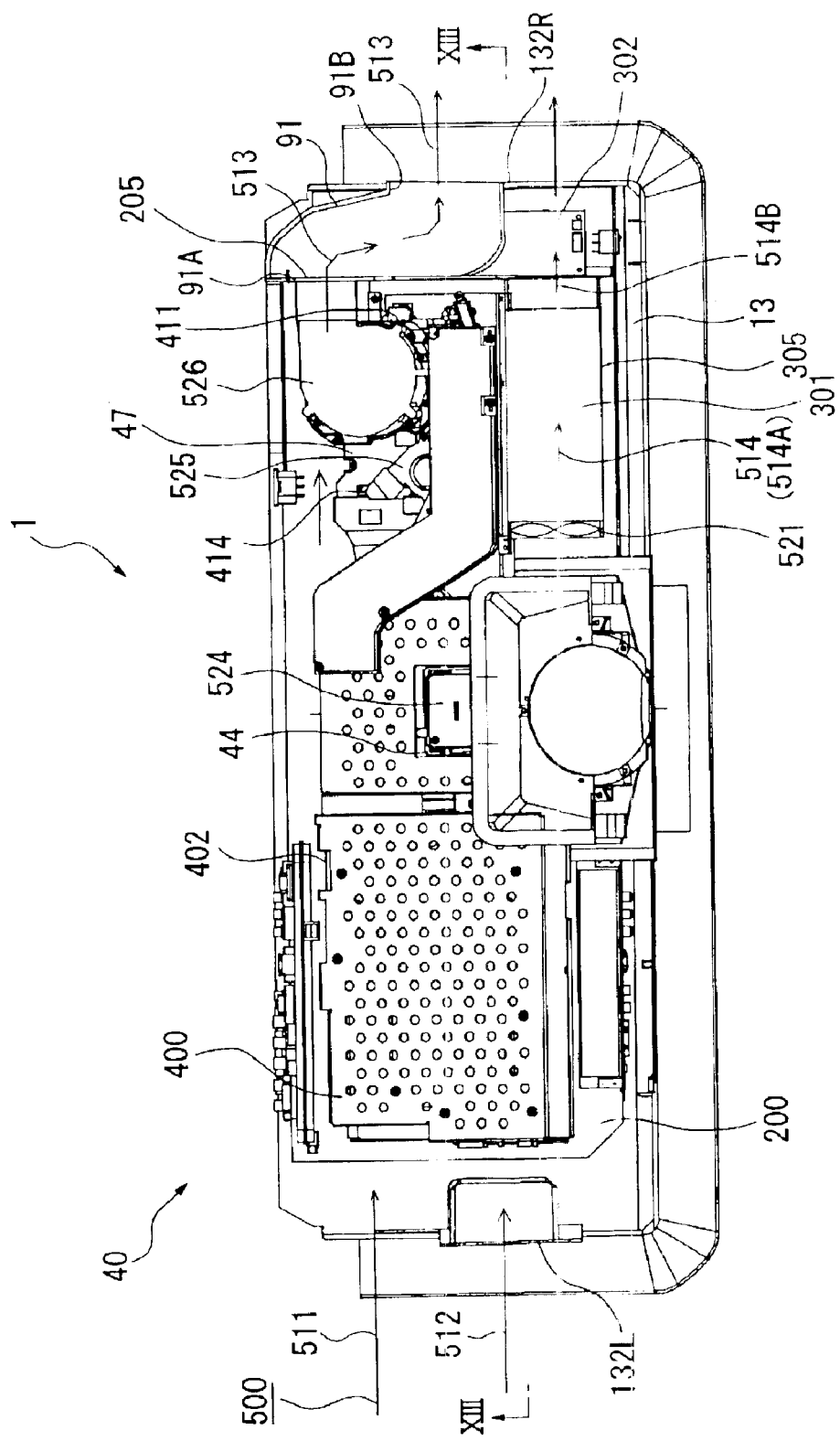
FIG. 12 is a plan view of the rear projector.
Figure 13:
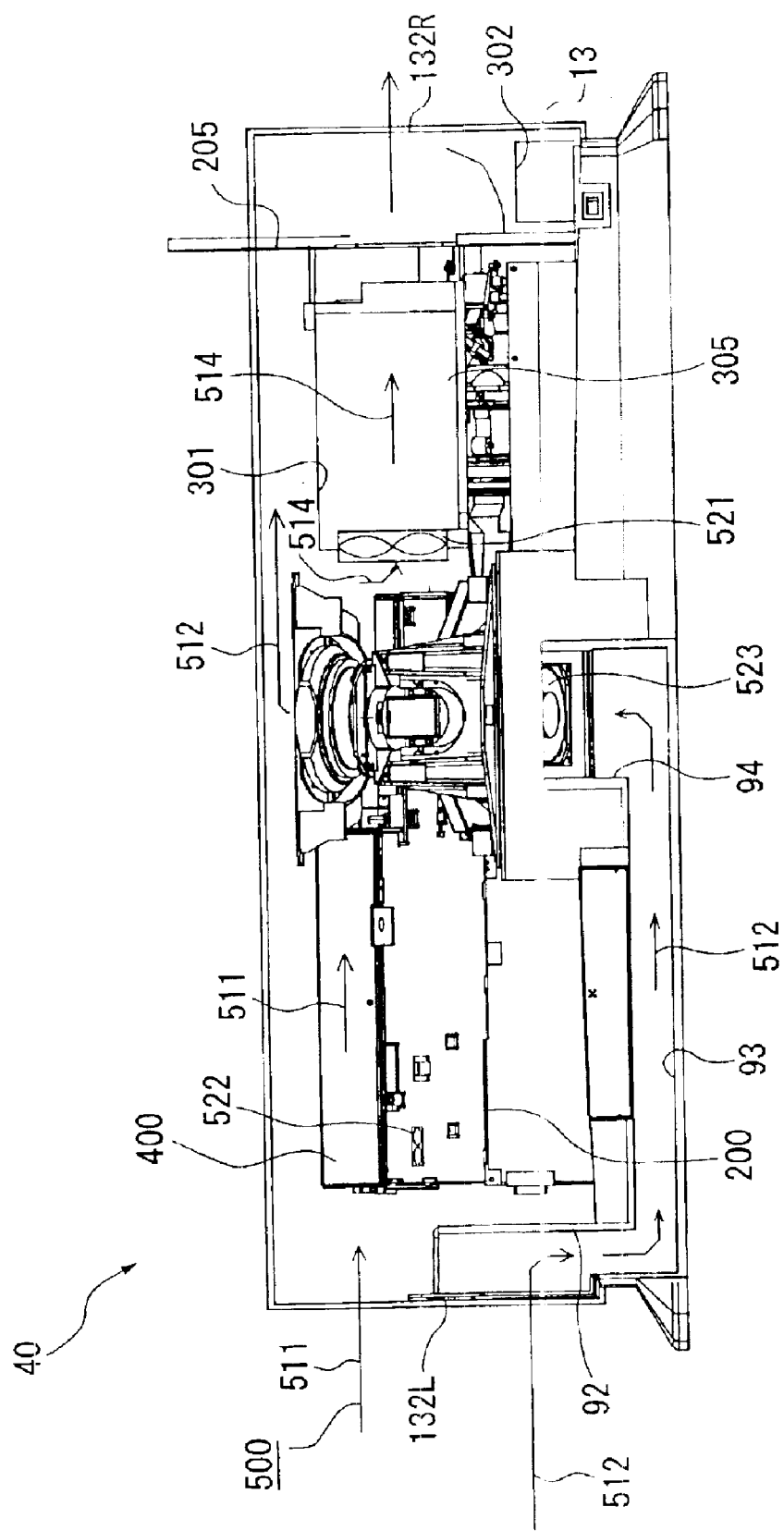
FIG. 13 is a vertical cross section taken along XIII—XIII line in FIG. 12.

FIG. 12 is a plan view showing the rear projector 1. FIG. 13 is a vertical cross section taken along XIII—XIII line in FIG. 12.

As shown in FIGS. 7, 12 and 13, the rear projector 1 is provided with an interior cooling area 500 for cooling the components 400, 200, 301 and 302 constituting the interior unit 40 and the inside of the cabinet 10. The interior cooling area 500 cools the entirety of the inside of the lower cabinet 13 including the interior unit 40.

As shown in FIGS. 12 and 13, the interior cooling area 500 introduces external cooling air from the intake opening 132L to the inside of the lower cabinet 13 to cool the respective components 400, 200, 301 and 302 inside the lower cabinet 13 and discharge the air having cooled the components from the exhaust opening 132R on the right side to the outside. In other words, a cooling channel for flowing the cooling air from the left side to the right side along the front side of the screen 51 is formed in the lower cabinet 13.

The interior cooling area 500 has a control board cooling channel 511, an optical device cooling channel 512, a light source cooling channel 513 and a power source cooling channel 514.

In the interior cooling area 500, as shown in FIGS. 12 and 13, a part of the external cooling air introduced from the intake opening 132L by axial-flow fans 522 and 523 is drawn in by the axial-flow fan 522 to cool the control board 402 while flowing along the control board cooling channel 511. A part of the rest of the cooling air is drawn by the axial-flow fan 523 and a sirocco fan 524 to flow through the optical device cooling channel 512 including the second to fourth ducts 92 to 94 to cool the optical device 44. The cooling air joins around the upper side of the optical device 44.

A first duct 91 disposed on the right side of the partition 205 extending in front and back direction is used in the light source cooling channel 513.

A part of the joined air is drawn by two sirocco fans 525 and 526 for cooling optical components as shown in FIG. 12, which flows in the light source cooling channel 513 in the light guide 47 to cool the polarization converter 414 and the light source 411 and subsequently flows in the first duct 91 to be discharged from the exhaust opening 132R to the outside.

On the other hand, the rest of the joined air is drawn by the axial-flow fan 521 to flow through the power source cooling channel 514 to cool the first power source 301 and the second power source 302, which is discharged from the exhaust opening 132R to the outside.

Two channels are provided as the exhaust channel for the air having cooled the components. The air having cooled the light source 411 is directly discharged to the outside through the dedicated first duct 91 without being in contact with the other components so as to avoid interference with the second power source 302.

5. Arrangement of Upper Cabinet

Next, arrangement of the upper side including the upper cabinet 12 will be described.

Figure 14:
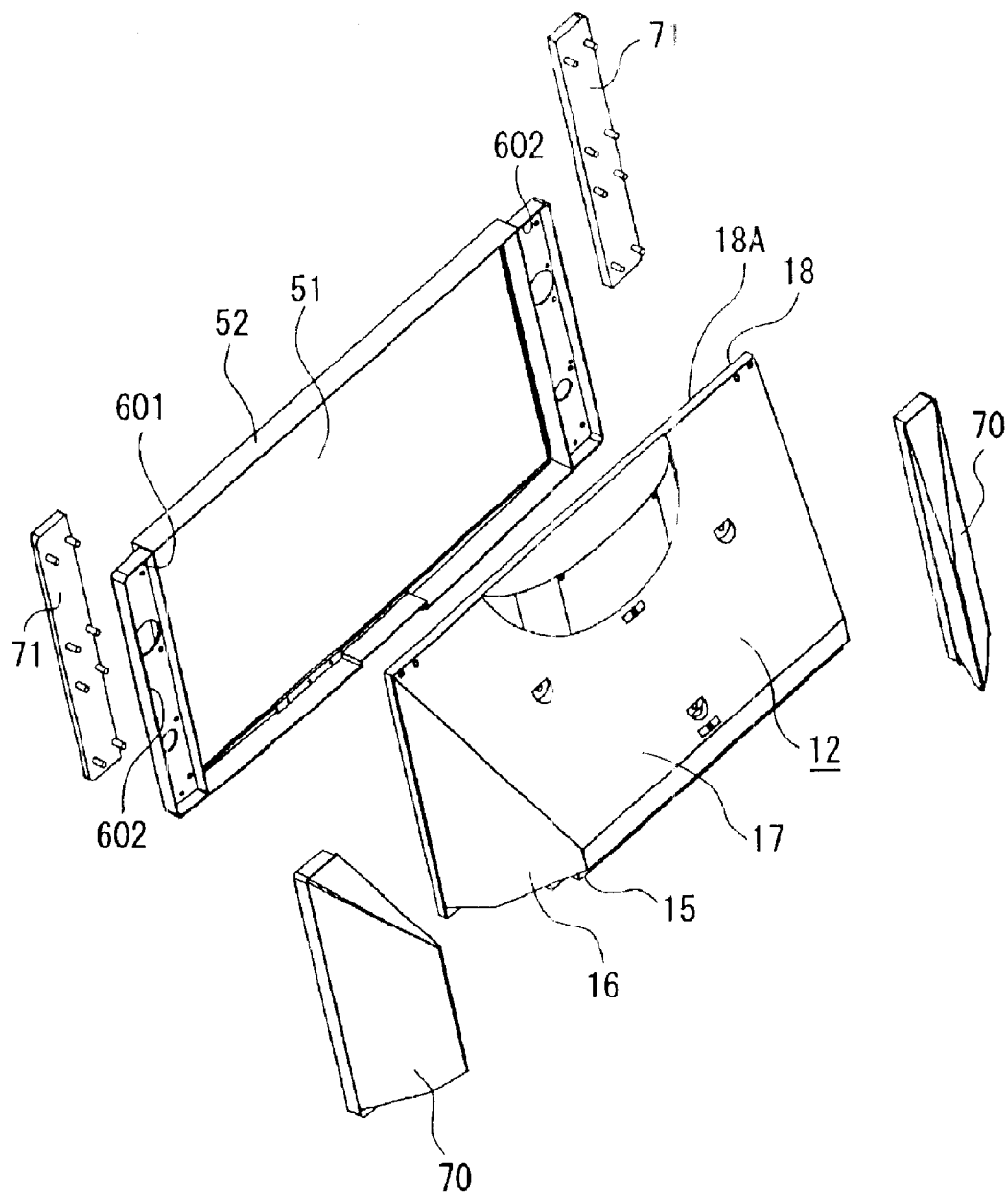
FIG. 14 is a perspective view showing the screen cover and a speaker box being attached to an upper cabinet.

FIG. 14 is a perspective view showing the screen cover 52 as a lid member and a speaker box 70 being attached to the upper cabinet 12.

As shown in FIG. 14, the upper cabinet 12 is a synthetic resin component produced by injection molding of a box-shape which disposes the reflection mirror and has the optical path of the light beam irradiated by the projection lens thereinside. The screen cover 52 as a frame-shaped lid member is attached to the front side of the upper cabinet 12.

The upper cabinet 12 has an approximately rectangular lower side 15, triangle right and left lateral sides vertically extending on both ends of the lower side 15, a back side spanning between the right and left lateral sides 16 to be slanted downward toward the lower side, and a flat front side 18 of approximately rectangle. An opening is formed at a position corresponding to the opening of the upper side 133 of the lower cabinet 13.

The screen cover 52 has a frame 601 of laterally elongated rectangle surrounding the front side 18 including the opening 18A, and speaker frames 602 of vertically elongated rectangle respectively formed on both right and left sides of the rectangular frame 601.

Figure 15:
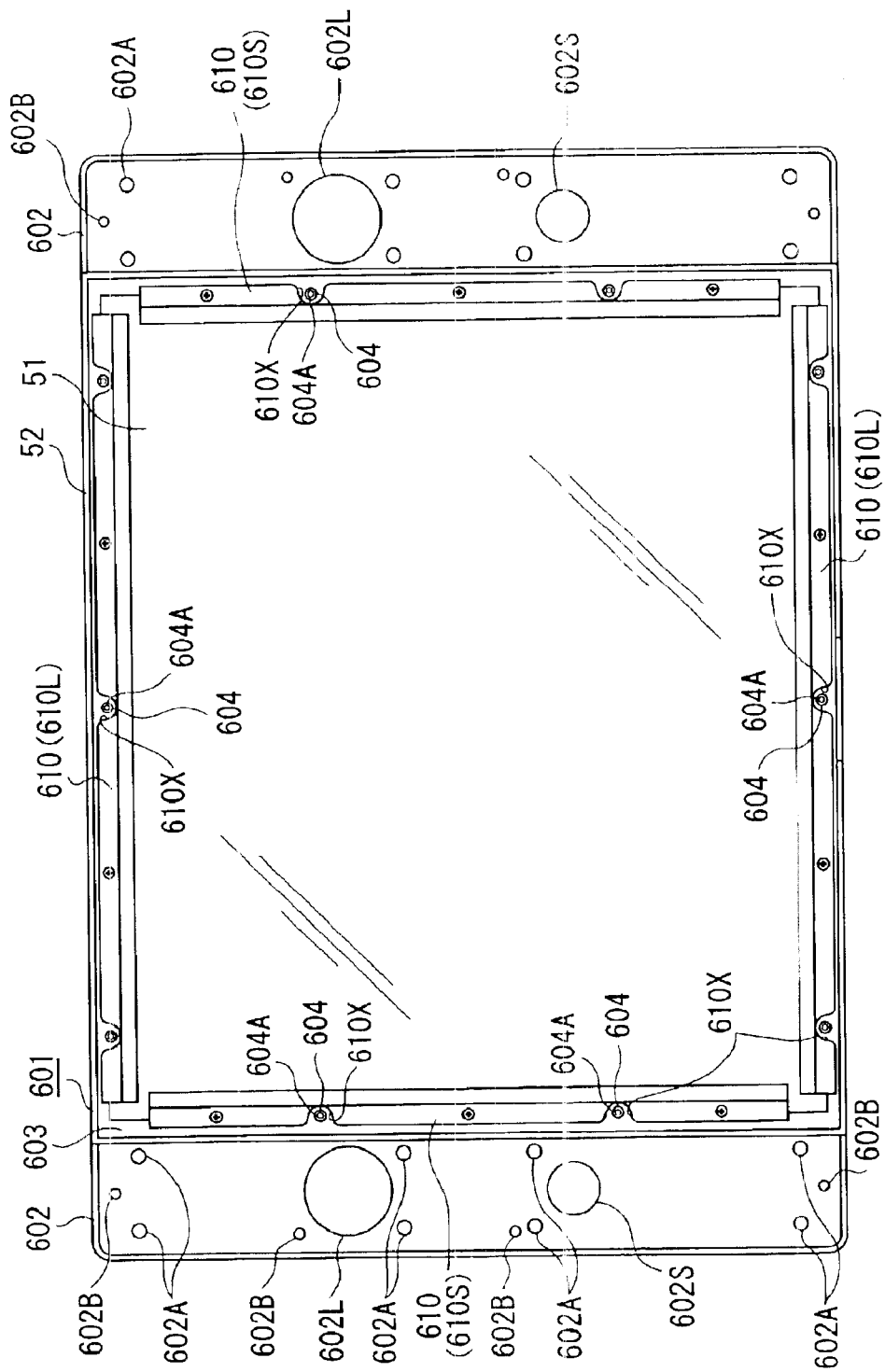

FIG. 15 is an illustration showing the screen cover 52 with the screen 51 being attached seen from rear side.

As shown in FIG. 15, the frame 601 receives the screen 51 along the opening 18A of the front side 18 with a gap secured there between, which includes a frame body 603 abutting the screen 51, and a plurality of bosses 604 as a connector projecting backward from the frame body 603 and provided with screw holes 604A at a distal end thereof.

A metal screen holder 610 is used for holding the screen 51 to the frame 601.

The screen 51 is held by the screen holder 610 such that, after the frame body 603 is brought into contact with the outer circumference of the screen 51, the screen 51 is sandwiched and screwed between the screen holder 610 and the frame body 603.

Incidentally, a part of the screen holder 610 being abutted to the screen 51 is provided with non-illustrated pad so that the backside of the screen 51 is not damaged.

The screen holder 610 has two screen holding members 610L and 610S of different length respectively formed in a dimension smaller than the vertical dimension and lateral dimension of the frame 601.

When the screen holder 610 (610L and 610S) is attached to the frame 601, notches 610X surrounding the bosses 604 are respectively formed at the position corresponding to the above-described plurality of bosses 604.

Accordingly, when the frame 601 attached with the screen 51 by the screen holder 610 is mounted on the upper cabinet 12, the non-illustrated holes formed on the front side of the upper cabinet 12 align with the screw holes 604A of the boss 604. The frame 601 is screwed and fixed to the upper cabinet 12 by inserting screws on the corresponding holes.

The respective speaker frames 602 are frame members for holding the below-described speaker box while covering the front side of the speaker box.

Two circular openings 602L and 602S of different size are vertically arranged on approximately central portion of the front plate of the speaker frame 602. Total eight holes 602A vertically arranged in two lines and four screw holes 602B are provided on the front plate of the speaker frame 602.

6. Arrangement of Sound Output

As shown in FIG. 1, the sound output 100 has the woofer box 60 (60L and 60R) disposed as a component of the casing and the speaker box 70.

As shown in FIG. 4, the woofer box 60 (60R, 60L) is a speaker for low-pitched sound as a casing constructed as a body independent of the lower cabinet 13, which is attachable to and detachable from the openings 131R and 131L of the lower cabinet 13 from the front side.

As shown in FIG. 14, the speaker box 70 is a speaker that outputs midrange and high-pitched sound, which is constructed as a body independent of the upper cabinet 12. The speaker box 70 is attached on the rear side of the speaker frame 602 constituting the screen cover 52 on both right and left sides of the upper cabinet 12.

Further, as shown in FIG. 14, a speaker grille 71 as a cover for covering the speaker frame 602 is attached to the front side of the right and left speaker frames 602 through projections 71A. The front side of the speaker grille 71 is approximately flush with the front side of the screen cover, both of the front sides being approximately parallel in vertical direction.

7. Producing Method of Upper Cabinet etc.

Next, the production process of the upper cabinet 12 provided with the speaker box 70 and the speaker grille 71 will be described below.

Figure 16:
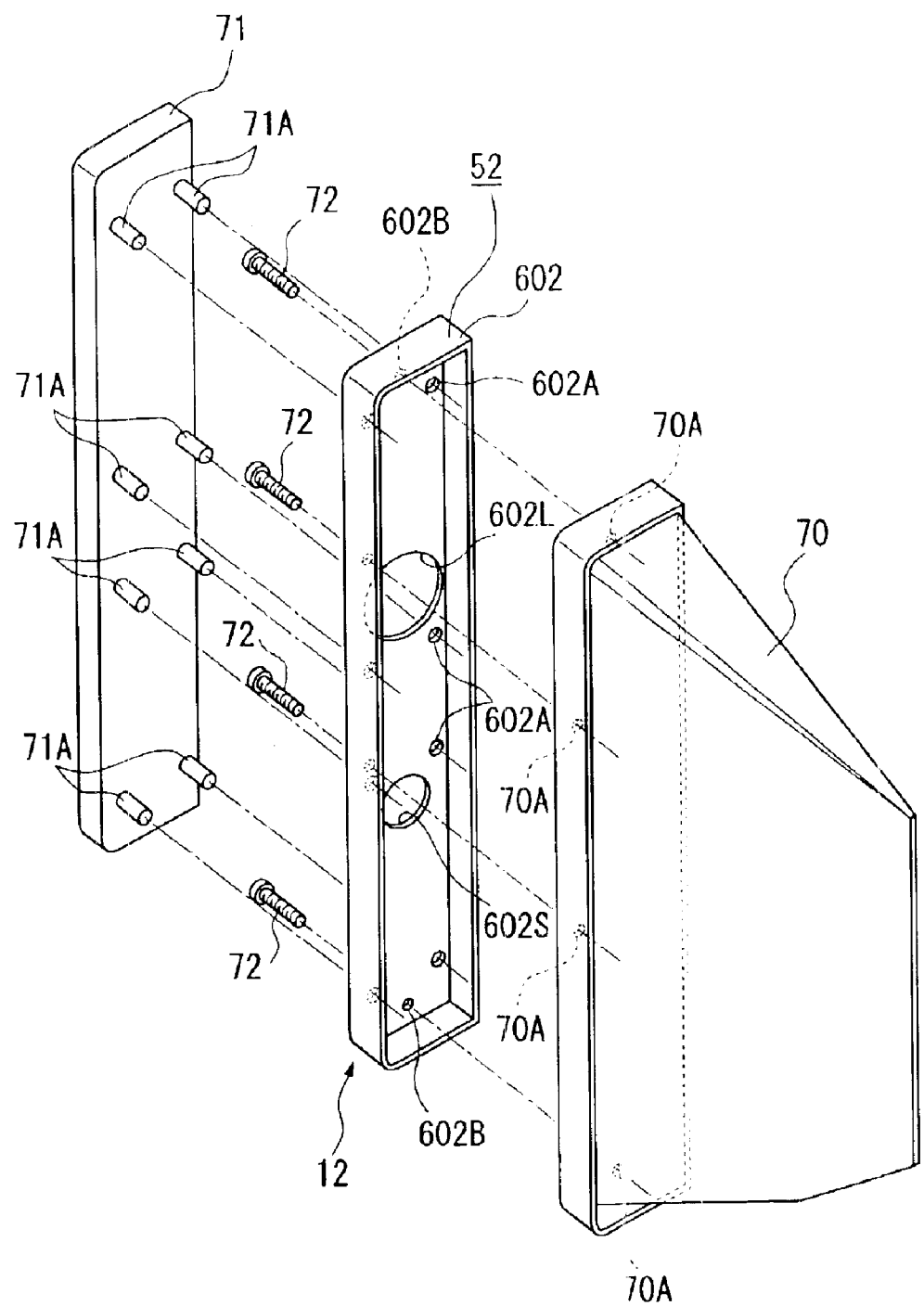
FIG. 16 is an illustration showing the speaker box being attached to the screen cover.

FIG. 16 is an illustration of the speaker box 70 and the speaker grille 71 being attached to the screen cover 52.

Before attaching the speaker box 70 and the speaker grille 71, as shown in FIG. 15, the outer circumference of the screen 51 is brought into contact with the frame body 603 of the frame 601 constituting the screen cover 52 and the screen 51 is fixed to the frame 601 of the screen cover 52 by screwing the screen holder 610 with the screen 51 sandwiched between the screen holder 610 and the frame body 603.

Next, the frame 601 attached with the screen 51 is mounted on the front side of the upper cabinet 12 and a screw is inserted after the non-illustrated holes formed on the front side of the upper cabinet 12 are aligned with the screw holes 604A on the boss 604.

Next, as shown in FIG. 16, the front side of the speaker box 70 is mounted to the speaker frame 602 and the holes 70A formed on the front side of the speaker box 70 are aligned with the screw holes 602B of the speaker frame 602, where a screw 72 is screwed to the holes 70A and 602B to fix the speaker box 70 to the speaker frame 602. Accordingly, the speaker box 70 is located on the lateral side of the upper cabinet 12.

Finally, the projection 71A formed on the speaker grille 71 is pushed to the hole 602A of the speaker frame 602 to fix the speaker grille 71 on the front side of the speaker frame 602.

8. Effect of Embodiment (1) Since the woofer box 60 is disposed in the lower cabinet 13, vibration caused by low-pitched frequency is not easily transferred to the screen 51 provided on the upper cabinet 12 and the reflection mirror 30 disposed in the upper cabinet 12 even when the sound of great volume is outputted by the woofer box 60, so that the image projected on the screen 51 is not flickered, thus providing high-quality image to the spectators.

(2) Since the speaker box 70 is provided on the right and left lateral sides of the upper cabinet 12, the sound outputted by the speaker box 70 is directly heard by the spectators without being blocked by the screen 51, the deformation of the screen 51 in out-plane direction can be avoided, thus providing high-quality image to the spectators.

(3) Since the speaker box 70 is a separate casing component independent of the upper cabinet 12, the size of the screen cover 52 and the upper cabinet 12 for attaching large-size screen 51 is not enlarged more than required. Since the screen cover 52 and the upper cabinet 12 are produced by injection molding, the size of the die for producing the components is not increased, thus reducing the cost for the die.

(4) Since a gap is provided between the frame 601 and the screen 51, the screen 51 is prevented from being bent during attachment on account of dimension error of the screen 51 and the screen cover 52.

(5) Since the boss is formed on the frame body 603 of the frame 602, no separate connector with the upper cabinet 12 is necessary on the screen cover 52, thus reducing production cost.

(6) Since the boss 604 is formed by projecting a part of the frame 601 by injection molding, the frame 601 and the boss 604 can be integrally molded, thus simplifying the structure of the die for molding the frame 601.

(7) Since the woofer box 60 is disposed in a dedicated casing component, directivity can be given to the sound outputted by the body of the woofer box 60, thus further enhancing acoustic effect.

(8) Since the woofer box 60 is attachable to and detachable from the lower cabinet 13, the image generator etc. can be adjusted by detaching the woofer box 60, thus easily adjusting the rear projector 1.

(9) Since the speaker box 70 is mounted after attaching the screen cover 52 fitted with the screen 51 to the upper cabinet 12, the speaker box 70 can be attached while protecting the light-incident surface of the screen 51 with the screen cover 52 and the upper cabinet 12, so that adhesion of dust on the light-incident surface of the screen 51 can be prevented in attaching the speaker box 70.

9. Modification of Embodiment

Incidentally, the scope of the present invention is not restricted to the above-described embodiment, but includes other arrangement is possible as long as an object of the present invention can be achieved, which includes following modifications.

Though the speaker box 70 is attached to the lateral side of the upper cabinet 12, the speaker box 70 may be attached to the lower cabinet 13 or the upper side of the upper cabinet 12. In this case, the shape of the speaker box 70 may be changed as desired in accordance with the configuration of the cabinet 10.

Though the woofer box 60 is a separate body independent of the lower cabinet 13, the woofer box 60 may be integrated with the lower cabinet 13. In this arrangement, the woofer box 60 may not be box-shaped.

Other arrangement and configuration are possible in implementing the present invention as long as an object of the present invention can be achieved.

What is claimed is:

1. A rear projector, comprising:
    an image generator including an optical device that modulates a light beam irradiated by a light source to form an optical image in accordance with image information, and a projection optical system that enlarges and projects the optical image;
    a sound output that outputs sound in accordance with sound information inputted together with the image information;
    a box-shaped casing in which the image generator is disposed; and
    a screen exposed on one of the casing onto which the optical image generated by the image generator is projected,
    the casing having a lower casing in which the image generator is disposed and an upper casing provided with the screen,
    the sound output having a low-pitched sound speaker and a high-pitched sound speaker,
    the low-pitched sound speaker being provided on the lower casing and the high-pitched sound speaker being provided on a side of the upper casing intersecting a side on which the screen is provided.

2. The rear projector according to claim 1, the upper casing comprising a front section having an opening for the screen to be attached and a body section in which an optical path of the light beam irradiated by the projection optical system is set,
    wherein the high-pitched sound speaker is disposed in a casing component independent of the upper casing,
    wherein the casing component is attached to the front section.

3. The rear projector according to claim 2, further comprising a frame on the front section, the frame surrounding the opening along a periphery thereof and receiving the screen with a gap retained between the frame and the screen,
    the front section having a plurality of connectors formed at a position corresponding to the gap between the frame and the screen to be connected with the body section.

4. The rear projector according to claim 1,
    the low-pitched sound speaker being disposed in a casing component independent of the lower casing and being removably attached to the lower casing together with the casing component.

5. The rear projector according to claim 1,
    the casing component being independent of the lower casing.

6. A producing method of a rear projector, the rear projector comprising:
    an image generator including an optical device that modulates a light beam irradiated by a light source to form an optical image in accordance with image information, and a projection optical system that enlarges and projects the optical image;
    a box-shaped casing in which the image generator is disposed;
    a screen, exposed on one side of the casing, onto which the optical image generated by the image generator is projected; and
    a sound output provided on a side of the casing intersecting the side provided with the screen and disposed in a casing component independent of the casing, the sound output outputting sound in accordance with sound information inputted together with the image information,
    the casing comprising a front section having an opening for the screen to be attached and a body section in which an optical path of the light beam irradiated by the projection optical system is set,
    the method comprising:
    attaching the screen on the front section;
    attaching the front section attached with the screen to the body section; and
    after attaching the front section, fixing the casing component in which the sound output is disposed to the front section to be attached to a lateral side of the body section.

7. The rear projector according to claim 5,
    the casing component containing no low pitched sound speaker.

* * * * *